United States Patent
Mukai et al.

(10) Patent No.: US 7,317,688 B2
(45) Date of Patent: Jan. 8, 2008

(54) OPTICAL COMMUNICATION SYSTEM WITH DYNAMIC BANDWIDTH ALLOCATION

(75) Inventors: Hiroaki Mukai, Tokyo (JP); Toshikazu Yoshida, Tokyo (JP); Tetsuya Yokotani, Tokyo (JP); Seiji Kozaki, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 901 days.

(21) Appl. No.: 09/983,644

(22) Filed: Oct. 25, 2001

(65) Prior Publication Data

US 2002/0173332 A1  Nov. 21, 2002

(30) Foreign Application Priority Data

May 16, 2001 (JP) .............................. 2001-146824

(51) Int. Cl.
*H04J 1/16* (2006.01)
(52) U.S. Cl. ...................... 370/236; 370/477; 398/182
(58) Field of Classification Search ............... 370/230, 370/236.1, 236.2, 468, 446–457, 461, 255, 370/230.1, 231–236, 477; 709/226, 229, 709/235; 398/58, 61, 70, 71, 99, 182
See application file for complete search history.

(56) References Cited

U.S. PATENT DOCUMENTS

| | | | | |
|---|---|---|---|---|
| 5,802,040 A * | 9/1998 | Park et al. | ................... | 370/232 |
| 5,850,399 A * | 12/1998 | Ganmukhi et al. | ......... | 370/412 |
| 5,850,400 A * | 12/1998 | Eames et al. | ................ | 370/443 |
| 6,091,740 A * | 7/2000 | Karasawa | ................... | 370/458 |
| 6,304,953 B1 * | 10/2001 | Henstrom et al. | .......... | 712/215 |
| 6,487,170 B1 * | 11/2002 | Chen et al. | ................. | 370/231 |
| 6,546,014 B1 * | 4/2003 | Kramer et al. | ......... | 370/395.41 |
| 6,697,374 B1 * | 2/2004 | Shraga et al. | ............... | 370/458 |
| 6,728,212 B1 * | 4/2004 | Tancevski | .................... | 370/235 |
| 6,728,248 B1 * | 4/2004 | Uchida et al. | ........... | 370/395.1 |
| 6,747,976 B1 * | 6/2004 | Bensaou et al. | ......... | 370/395.4 |
| 6,778,557 B1 * | 8/2004 | Yuki et al. | ................... | 370/468 |

(Continued)

FOREIGN PATENT DOCUMENTS

EP          0 933 967          8/1999

(Continued)

OTHER PUBLICATIONS

ITU-T Recommendation G.983.1, Series G: Transmission Systems and Media, Digital Systems and Networks, Digital transmission systems—Digital sections and digital line system—Optical line systems for local and access networks, Broadband optical access systems based on Passive Optical Networks (PON), Proceedings of International Telecommunication Union, Oct. 1998, pp. 1-118.

(Continued)

*Primary Examiner*—Wellington Chin
*Assistant Examiner*—Ahmed Elallam
(74) *Attorney, Agent, or Firm*—Oblon, Spivak, McCelland, Maier & Neustadt, P.C.

(57) ABSTRACT

Dynamic up-link bandwidth allocation is realized in a optical communication system in which a plurality of subscriber devices with mutually different device configurations are connected to a station unit, by configuring the station unit to consider device configurations of the subscriber devices in performing up-link bandwidth allocation.

15 Claims, 7 Drawing Sheets

U.S. PATENT DOCUMENTS

2002/0032754 A1* 3/2002 Logston et al. .............. 709/219
2002/0075875 A1* 6/2002 Dravida et al. ........ 370/395.21

FOREIGN PATENT DOCUMENTS

| | | |
|---|---|---|
| JP | 11-017685 | 1/1999 |
| JP | 11-341037 | 12/1999 |
| JP | 11-355301 | 12/1999 |
| WO | WO 99/26378 | 5/1999 |

OTHER PUBLICATIONS

H. K. Boinepelli, et al., Global Telecommunications Conference, pp. 893-897, XP-010109786, "An Algorithm for Burst Reservation Packet Service", Nov. 29, 1993.

F. J. M. Panken, Broadband Communications. Global Infrastructure for the Information Age. Proceedings of the International IFIP-IEEE Conference on Broadband Communications, pp. 321-332, XP-010525732, "A TDMA Based Access Control Scheme for an ATM Passive Optical Tree Network", Apr. 23, 1996.

* cited by examiner

OPTICAL COMMUNICATION SYSTEM WITH DYNAMIC BANDWIDTH ALLOCATION

BACKGROUND OF THE INVENTION

Field of the Invention

The present invention generally relates to optical communication systems and, more particularly, to an asynchronous transfer mode passive optical network (ATM-PON) system in which a bandwidth of up-link signals output from subscriber equipment is dynamically allocated.

FIG. 4 shows a construction of a related-art optical communication system shown in Japanese Laid-Open Patent Application No. 11-341037. Referring to FIG. 4, the related-art optical communication system comprises a station unit provided in a station, subscriber devices 2-1-2-N provided at subscriber's premises and performing bidirectional communication with the station unit 1, and a star coupler 3.

An optical-electrical (O/E) conversion unit 11 converts a down-link electrical signal output from a down-link signal generation unit 16 to an optical signal and converts an up-link signal output from the subscriber devices 2-1-2-N into electrical signals. An up-link signal termination unit 12 extracts a reporting message from the up-link signal. A congestion detection unit 13 decodes the reporting message extracted by the up-link signal termination unit 12. A bandwidth control unit 14 calculates a bandwidth of the up-link signal from each of the subscriber devices 2-1-2-N, based on the decoded result from the congestion detection unit 13. A transmission permission code generation unit 15 generates a transmission permission code depending on the bandwidth of the up-link signal calculated by the bandwidth control unit 14. A down-link signal generation unit 16 combines the transmission permission signal code generated by the transmission permission signal code generation unit 15 with the down-link signal.

An O/E conversion unit 21 converts the electrical up-link signal output from an up-link signal generation unit 27 into an optical signal and converts the optical down-link signal output from the base station 1 into an electrical signal. A down-link signal termination unit 22 extracts the transmission permission signal code from the down-link signal. A transmission timing generation unit 23 instructs a scheduler 25 to transmit up-link data when the transmission permission signal code extracted by the down-link signal termination unit 22 indicates that the transmission of the up-link data is permitted. When the transmission permission signal code indicates that reporting message transmission is permitted, the transmission timing generation unit 23 instructs a congestion reporting unit 26 to transmit the reporting message.

Buffer memories 24-1-24-m store up-link data. A scheduler 25 schedules outputs of data stored in the buffer memories 24-1-24-m when the instruction for up-link data transmission is received from the transmission timing generation unit 23. When the instruction for message transmission is received from the transmission timing generation unit 23, a congestion reporting unit 26 informs itself of the status of congestion, based on the number of cells stored in the buffer memories 24-1-24-m, so as to generate and output the reporting message indicating the status of congestion. An up-link signal generation unit 27 generates the up-link signal from the up-link data and the reporting message.

A description will now be given of the operation.

The O/E conversion unit 11 of the station unit 1 converts the up-link signal received from each of the subscriber devices 2-1-2-N into the electrical signal.

The up-link signal termination unit 12 extracts the reporting message from the up-link signal past the O/E conversion unit 11.

The congestion detection unit 13 decodes the reporting message extracted from the up-link signal termination unit 12.

The bandwidth control unit 14 informs itself of the status of congestion of the up-link signals from the subscriber devices 2-1-2-N, by examining the result of decoding in the congestion detection unit 13, and calculates the bandwidth to be assigned to the up-link signal from each of the subscriber devices 2-1-2-N, depending on the status of congestion. More specifically, the bandwidth control unit 14 calculates the bandwidth of the up-link signal from the subscriber devices 2-1-2-N so that a wider bandwidth is allocated to the up-link signal from the subscriber device associated with a high degree of congestion.

The transmission permission signal code generation unit 15 generates the transmission permission signal code in accordance with the bandwidth calculated by the bandwidth control unit 14 for the up-link signals from the subscriber devices. The wider the bandwidth of the up-link signal, the higher the frequency of generating the transmission permission signal code.

The down-link signal generation unit 16 combines the down-link signal with the transmission permission signal code generated by the transmission permission signal code generation unit 15, so as to output the combined signal to the O/E converter unit 11.

The O/E converter unit 11 converts the down-link signal including the transmission permission signal code into an optical signal and transmit the resultant down-link signal to a corresponding one of the subscriber devices 2-1-2-N.

The O/E conversion unit 21 of the corresponding one of the subscriber devices 2-1-2-N converts the down-link signal received from the station unit 1 into an electrical signal.

The down-link signal termination unit 22 extracts the transmission permission signal code from the down-link signal past the O/E conversion unit 21.

When the transmission permission signal code extracted by the down-link signal termination unit 22 indicates that up-link data transmission is permitted, the transmission timing generation unit 23 instructs the scheduler 25 to transmit the up-link data. When the transmission permission signal code indicates permission of reporting message transmission, the transmission timing generation unit 23 instructs the congestion reporting unit 26 to transmit the reporting message.

The scheduler 25 receiving the instruction to transmit the up-link data from the transmission timing generation unit 23 schedules outputting of the up-link data stored in the buffer memories 24-1-24-m so as to output the up-link data to the up-link signal generation unit 27.

When the instruction for reporting message transmission is received from the transmission timing generation unit 23, the congestion reporting unit 26 informs itself of the status of congestion, based on the number of cells in the up-link data stored in the buffer memories 24-1-24-m.

The congestion reporting unit 26 then generates the reporting message indicating the status of congestion and outputs the reporting message to the up-link signal generation unit 27.

The up-link signal generation unit 27 generates the up-link signal from the up-link data and the reporting message. The O/E conversion unit 21 converts the up-link signal output from the up-link signal generation unit 27 into an optical signal and outputs the up-link signal to the station unit 1.

With this, the bandwidth is dynamically allocated to the up-link signal output from each of the subscriber devices 2-1-2-N in accordance with the traffic in the subscriber devices 2-1-2-N.

Japanese Laid-Open Patent Application No. 11-355301 also discloses dynamic allocation of the bandwidth to the up-link signal output from the subscriber devices 2-1-2-N (see FIG. 5).

In the art disclosed in Japanese Laid-Open Patent Application, the congestion reporting unit 26 is not provided in the subscriber devices 2-1-2-N. The congestion detection unit 13 provided in the station unit 1 monitors the status of the up-link signal transmitted from each of the subscriber devices 2-1-2-N in order to detect the status of congestion in each of the subscriber devices 2-1-2-N. The bandwidth of the up-link signal output from each of the subscriber devices 2-1-2-N is set in accordance with the result of detection.

FIG. 6 shows a construction of a related-art optical communication system shown in Japanese Laid-Open Patent Application No. 11-017685. As illustrated, a plurality of schedulers 25-1-25-n are provided in each of the subscriber devices 2-1-2-N.

In this case, it is possible to independently allocate a bandwidth to each communication service class or to each of users accommodated in the subscriber device, by using transmission permission signal codes to distinguish between communication service classes or between users accommodated in the subscriber device.

By allocating a plurality of transmission permission signal codes to a given subscriber device, and independently generating the transmission permission signal codes, dynamic bandwidth allocation is implemented.

FIG. 7 shows a construction in which a plurality of schedulers 25-1-25-n are provided in each of the subscriber devices 2-1-2-N and the congestion reporting unit 26 is provided in each of the subscriber devices 2-1-2-N.

As described, according to the related art, the subscriber devices 2-1-2-N may or may not be provided with the congestion reporting unit 26. The subscriber devices 2-1-2-N may or may not be provided with a single scheduler 25 or a plurality of schedulers 25-1-25-n. When the subscriber devices 2-1-2-N of different configurations are connected to the station unit 1, dynamic bandwidth allocation to up-link signals fails.

The station unit 1 operates on an assumption that the subscriber devices 2-1-2-N connected thereto are of the same configuration and is not adapted for a plurality of bandwidth allocation methods. Therefore, if the subscriber devices are of different configurations, it is impossible to implement dynamic bandwidth allocation to up-link signals.

SUMMARY OF THE INVENTION

Accordingly, a general object of the present invention is to provide an optical communication system in which the aforementioned problems are eliminated.

Another and more specific object is to provide an optical communication system in which dynamic up-link bandwidth allocation is realized even when a plurality of subscriber devices with mutually different device configurations are connected to a station unit.

The aforementioned objects can be achieved by an optical communication system comprising: a station unit; a plurality of subscriber devices connected to the station unit via an optical communication network, wherein the station unit allocates a bandwidth to up-link signals output from the plurality of subscriber devices in accordance with the traffic in the plurality of subscriber devices, and the station unit selects a method of up-link bandwidth allocation by considering device configurations of the plurality of subscriber devices.

The station unit may receive configuration information indicating a configuration of a corresponding one of the plurality of subscriber devices, from each of the subscriber devices.

The station unit may receive an operator input of the configuration information.

The station unit may allocate an up-link bandwidth to each communication service class, by allocating an additional transmission permission signal code to an associated one of the plurality of subscriber devices, when a communication service class provided by a connection already set up is different from a communication service class provided by a new communication to be set up, on the condition that it is determined from the configuration information that it is possible to allocate an additional transmission permission signal code to the associated one of the plurality of subscriber devices.

The station unit may allocate an up-link bandwidth without allocating an additional transmission permission signal code, when a communication service class provided by a connection already set up is different from a communication service class provided by a new communication to be set up, and when it is determined from the configuration information that it is impossible to allocate an additional transmission permission signal code to an associated one of the plurality of subscriber devices.

The station unit may allocate an up-link bandwidth to each subscriber accommodated in an associated one of the plurality of subscriber devices, by allocating an additional transmission permission signal code to the associated one of the plurality of subscriber devices, when a communication service class provided by a connection already set up is the same as a communication service class provided by a new communication to be set up, on the condition that there is a request for allocation of a new transmission permission signal code, and that it is determined from the configuration information that it is possible to allocate an additional transmission permission signal code to the associated one of the plurality of subscriber devices.

The station unit is allowed not to perform dynamic up-link bandwidth allocation when it is determined from the configuration information that only a communication service class of a constant bit rate is provided by a connection set up.

The station unit may allocate an up-link bandwidth to each communication service class, by allocating an additional transmission permission signal code to an associated one of the plurality of subscriber devices, when a communication service class provided by a subscriber interface already set up is different from a communication service class provided by a new subscriber interface to be set up, on the condition that it is determined from the configuration information that it is possible to allocate an additional transmission permission signal code to the associated one of the plurality of subscriber devices.

The station unit may allocate an up-link bandwidth without allocating an additional transmission permission signal code, when a communication service class provided by a subscriber interface already set up is different from a communication service class provided by a new subscriber interface to be set up, and when it is determined from the configuration information that it is impossible to allocate an additional transmission permission signal code to an associated one of the plurality of subscriber devices.

The station unit may allocate an up-link bandwidth to each subscriber accommodated in an associated one of the plurality of subscriber devices, by allocating an additional transmission permission signal code to the associated one of the plurality of subscriber devices, when a communication service class provided by a subscriber interface already set up is the same as a communication service class provided by a new subscriber interface to be set up, on the condition that there is a request for allocation of a new transmission permission signal code, and that it is determined from the configuration information that it is possible to allocate an additional transmission permission signal code to the associated one of the plurality of subscriber devices.

The station unit is allowed not to perform dynamic up-link bandwidth allocation when it is determined from the configuration information that only a communication service class of a constant bit rate is provided by a subscriber interface set up.

The station unit may allocate time slots for congestion reporting when it is determined that an associated one of the subscriber devices is equipped with a congestion reporting function, so as to perform up-link bandwidth allocation by referring to a congestion report transmitted from the associated one of the plurality of subscriber devices.

The station unit may monitor a status of up-link signals from the plurality of subscriber devices, when it is determined from the configuration information that an associated one of the plurality of subscriber devices is not equipped with a congestion reporting function.

BRIEF DESCRIPTION OF THE DRAWINGS

Other objects and further features of the present invention will be apparent from the following detailed description when read in conjunction with the accompanying drawings, in which.

DESCRIPTION OF THE PREFERRED EMBODIMENTS

First Embodiment

Figure 1:
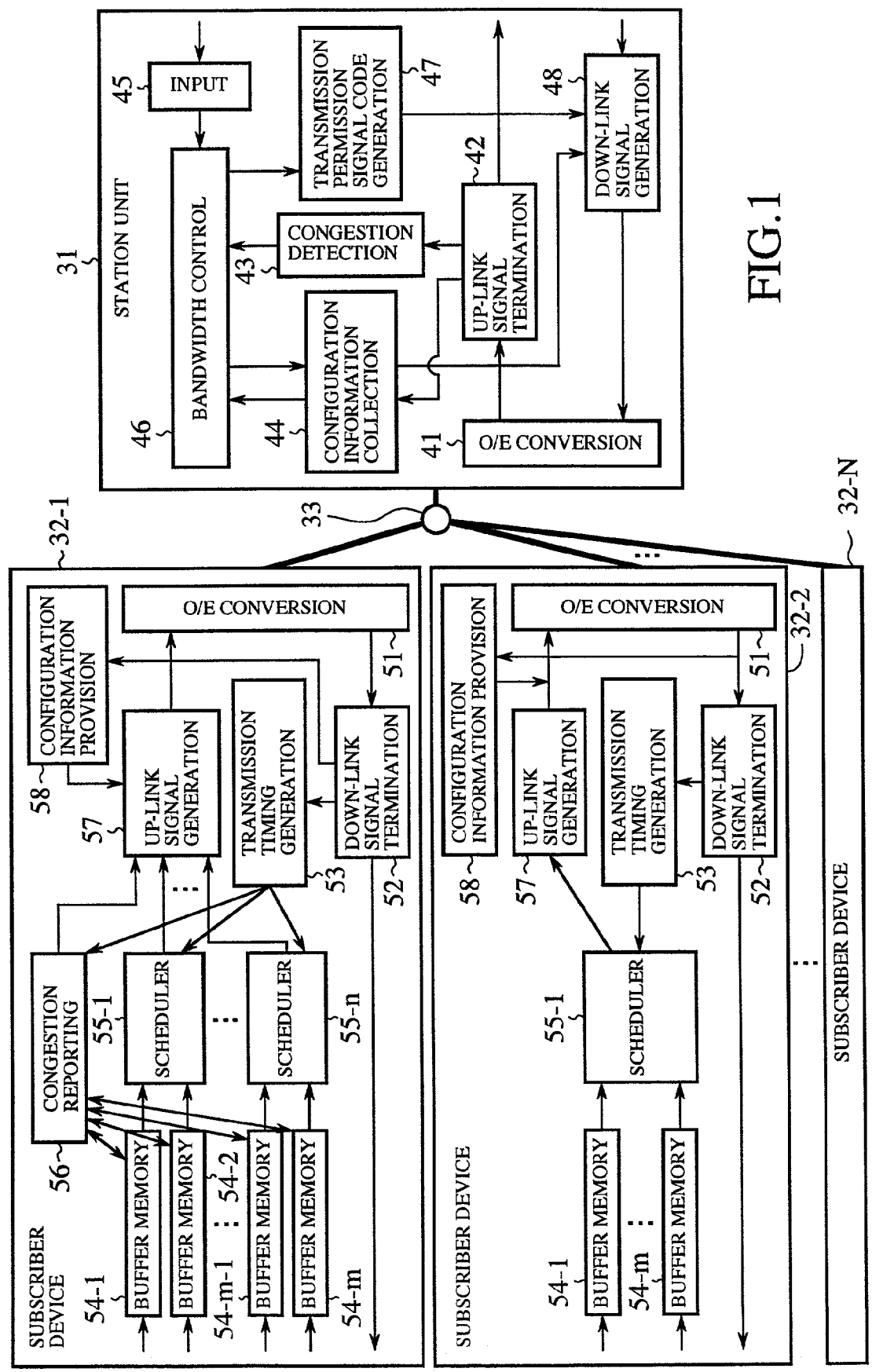
FIG. 1 shows a construction of an optical communication system according to a first embodiment of the present invention.

FIG. 1 shows a construction of an optical communication system according to a first embodiment of the present invention. Referring to FIG. 1, the optical communication system comprises a station unit 31 provided in a station, subscriber devices 32-1-32-N provided in subscriber premises and performing bidirectional communication with the station unit 31, and a star coupler 33.

An optical/electrical (O/E) conversion unit 41 converts a down-link electrical signal output from a down-link signal generation unit 48 into an optical signal and also converts an up-link optical signal from each of the subscriber devices 32-1-32-N into an electrical signal. An up-link signal termination unit 42 extracts a reporting message from the up-link signal. A congestion detection unit 43 decodes the reporting message extracted by the up-link signal termination unit 42. A configuration information collection unit 44 receives information indicating a configuration of a transmitting subscriber device. An input unit 45 receives an operator input configuration information.

A bandwidth control unit 46 selects a method of bandwidth allocation to up-link signals taking into account the configuration of each of the subscriber devices 32-1-32-N and calculates a bandwidth allocated to the up-link signal from each of the subscriber devices 32-1-32-N according to the selected method. A transmission permission signal code generation unit 47 generates a transmission permission signal code in accordance with the up-link bandwidth thus calculated. A down-link signal generation unit 48 combines the transmission permission signal code generated by the transmission permission signal code generation unit 47 with down-link data.

An O/E conversion unit 51 converts the electrical up-link signal output from an up-link signal generation unit 57 into an optical signal and converts the optical down-link signal output from the base station 31 into an electrical signal. A down-link signal termination unit 52 extracts the transmission permission signal code from the down-link signal. A transmission timing generation unit 53 instructs schedulers 55-1-55-N to transmit up-link data when the transmission permission signal code extracted by the down-link signal termination unit 52 indicates that the transmission of the up-link data is permitted. When the transmission permission signal code indicates that reporting message transmission is permitted, the transmission timing generation unit 53 instructs a congestion reporting unit 56 to transmit the reporting message.

Buffer memories 54-1-54-m store up-link data. Schedulers 55-1-55-n schedule outputs of data stored in the buffer memories 54-1-54-m when the instruction for up-link data transmission is received from the transmission timing generation unit 53. When the instruction for reporting message transmission is received from the transmission timing generation unit 53, a congestion reporting unit 56 informs itself of the status of congestion, based on the number of cells stored in the buffer memories 54-1-54-m, so as to generate and output the reporting message indicating the status of congestion. An up-link signal generation unit 57 generates the up-link signal from the up-link data and the reporting message. A configuration information provision unit 58 transmits configuration information indicating a configuration of the associated subscriber device.

Figure 2:
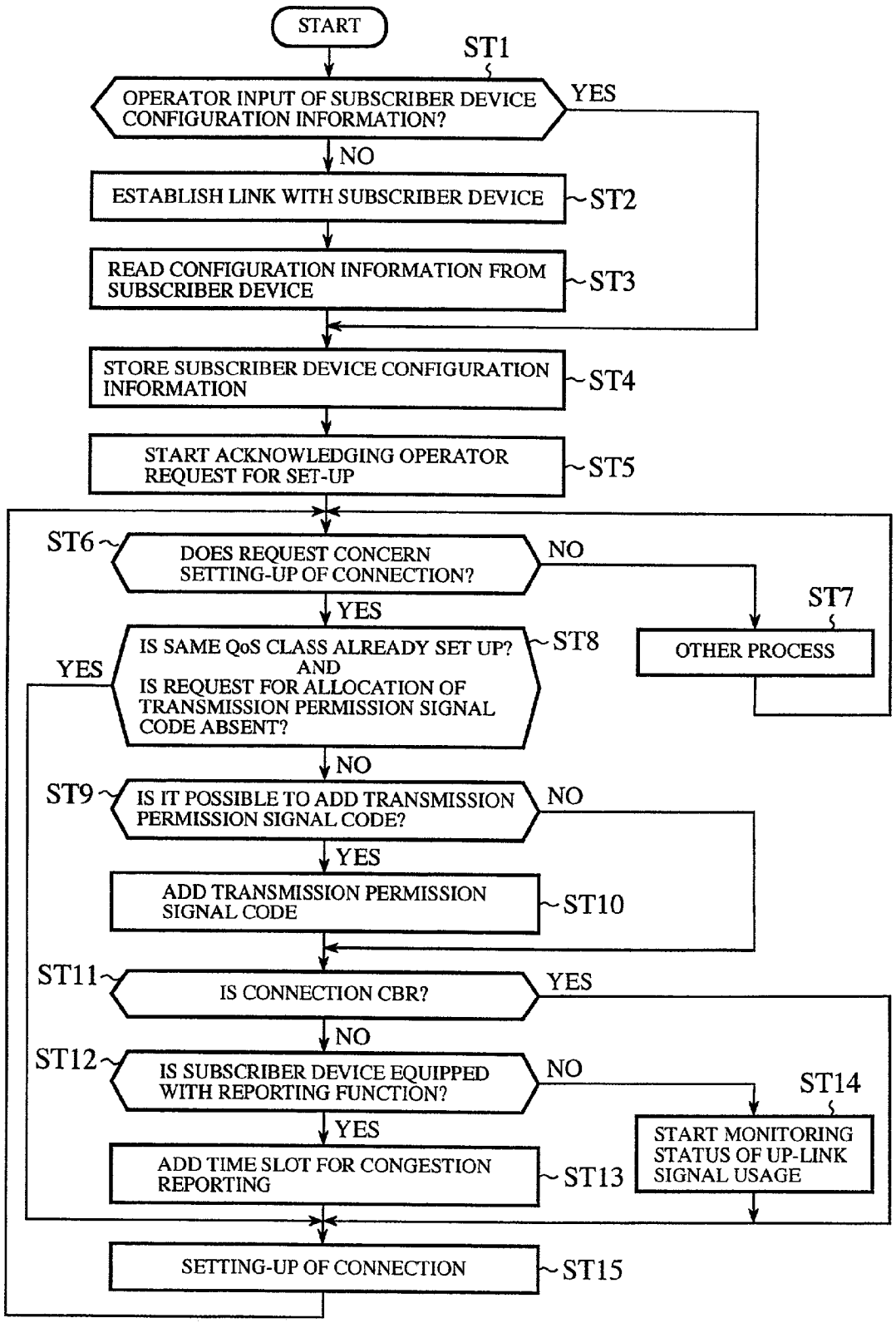
FIG. 2 is a flowchart showing a process performed by a bandwidth control unit.

FIG. 2 is a flowchart showing a process executed by the bandwidth control unit 46.

A description will now be given of the operation according to the first embodiment.

When the station unit 31 starts bidirectional communication with the subscriber devices 32-1-32-N, the bandwidth control unit 46 of the station unit 31 makes a determination as to whether the input unit 45 receives an operator input of configuration information indicating the configuration of any of the subscriber devices 32-1-32-N (step ST1). For convenience of description, it is assumed here that there is no operator input provided.

Upon determination that an operator input is not received via the input unit 45, the bandwidth control unit 46 establishes a link with the subscriber devices 32-1-32-N (step ST2) and allows the configuration information collection unit 44 to transmit a request for configuration information to the associated one of the subscriber devices 32-1-32-N.

The configuration information provision unit 58 of the associated one of the subscriber devices 32-1-32-N, receiving the request for configuration information from the station unit 31, transmit the configuration information of the associated subscriber device to the station unit 31.

When the configuration information collection unit 44 receives the configuration information, the bandwidth control unit 46 stores the configuration information related to the associated one of the subscriber devices 32-1-32-N (steps ST3, ST4). When an operator input of configuration information is provided, the configuration information collection unit 44 stores the provided information.

The bandwidth control unit 46 then acknowledges an operator request for setting up a new connection or for setting up a subscriber interface (step ST5). For convenience of description, it is assumed here that the bandwidth control unit 46 acknowledges a request for setting up a variable bit rate (VBR) connection in a state in which a constant bit rate (CBR) connection is already established.

The bandwidth control unit 46 then makes a determination as to whether the acknowledged request concerns setting up of a connection (step ST6), then proceeding to step ST7 if the acknowledged request does not concern setting up of a connection, or proceeding to step ST8 if the acknowledged request concerns setting up of a connection. Since the request for setting up a VBR connection is acknowledged, control is turned to step ST8.

In step ST8, the bandwidth control unit 46 refers to the configuration information related to an associated one of the subscriber devices 32-1-32-N and determines whether the same communication service class as requested is already set up. More specifically, the bandwidth control unit 46 determines whether a VBR connection is already set up for the associated one of the subscriber devices 32-1-32-N. A negative result of determination, i.e., a determination that the same communication service class is not set up, is yielded in step ST8 since only the CBR connection is already set up.

The bandwidth control unit 46 determines whether there is an operator request for allocation of an additional transmission permission signal code to the associated one of the subscriber devices 32-1-32-N. For convenience of description, it is assumed here that there is an operator request for allocation of a transmission request. When the same communication service class is not already set up or when there is a request for allocation of a transmission permission signal code, the bandwidth control unit 46 refers to the configuration information related to the associated one of the subscriber devices 32-1-32-N so as to determine whether it is possible to allocate a transmission permission signal code (step ST9). In the case of the subscriber device 32-2, a negative result of determination is yielded in step ST9 since there is only one scheduler. In the case of the subscriber device 32-1, a positive result of determination is yielded since there are a plurality of schedulers.

The bandwidth control unit 46 allocates an additional transmission permission signal code to the subscriber device 32-1 (step ST10) for which a positive result of determination is obtained in step ST9. No additional transmission permission signal code is allocated to the subscriber device 32-2.

The bandwidth control unit 46 then determines whether the new connection to be established is a CBR connection (step ST11). If the connection to be established is a VBR connection, control is turned to step ST12 since the VBR connection is associated with variable traffic and the bandwidth is more efficiently used by dynamically controlling the frequency of generation of a transmission permission signal code additionally allocated.

In step ST12, a determination is made as to whether the associated one of the subscriber devices 32-1-32-N is equipped with the congestion reporting unit 56, by referring to the configuration information related to the associated one of the subscriber devices 32-1-32-N. A positive result of determination is yielded for the subscriber device 32-1 and a negative result of determination is yielded for the subscriber device 32-2.

The bandwidth control unit 46 then allocates a time slot for congestion reporting to the subscriber device 32-1 determined to be equipped with the congestion reporting unit 56 (step ST13). With this, it is ensured that the bandwidth is dynamically allocated to the up-link signal by referring to the status of congestion reported by the congestion reporting unit 56.

A time slot for congestion reporting is not allocated to the subscriber device 32-2 determined to be not equipped with the congestion reporting unit 56. Instead, the congestion detection unit 43 monitors the status of the use of the up-link signal by the subscriber devices 32-1-32-N (step ST14). Thus, dynamic bandwidth allocation to up-link signals is processed by considering the status of usage of up-link signals.

Finally, the requested VBR connection is established for the associated one of the subscriber devices 32-1-32-N before ending the entire process (step ST15).

As described, according to the first embodiment, a bandwidth allocation method is selected by allowing the station unit 31 to consider the configuration of the associated one of the subscriber devices 32-1-32-N. With this, dynamic bandwidth allocation to the up-link signals is achieved even when a plurality of subscriber devices having different configurations are connected to the station unit 31.

Second Embodiment

In the first embodiment, an example is given where an additional transmission permission signal code is allocated when the communication services class of a connection already set up is different from a communication service class of a new connection to be set up. Alternatively, an additional transmission permission signal code may be allocated, upon request for allocation thereof, to an associated one of the subscriber devices 32-1-32-N even when the communication service class of a connection already set up is the same as a communication service class of a new connection to be set up, on the condition that it is known from the configuration information related to the associated one of the subscriber devices 32-1-32-N that it is possible to allocate an additional transmission permission signal code. With this, it is ensured that the up-link bandwidth is allocated to each subscriber accommodated in the associated one of the subscriber devices 32-1-32-N.

For example, when a request for setting up a VBR connection is acknowledged in a state in which a VBR connection is already set up, control is turned from step ST8 to step ST15 absent any request for allocation of an additional transmission permission signal code. If there is a request for allocation of an additional transmission permission signal code, control is turned from step ST8 to step ST9. Subsequently, the same steps as executed in the first embodiment are executed.

Accordingly, an up-link bandwidth is independently allocated to each subscriber accommodated in a subscriber device upon an operator request for allocation of an additional transmission permission signal code.

Third Embodiment

In the first embodiment, a description is given of a case where a request for a VBR connection is acknowledged in a state in which a CBR connection is already established. Dynamic allocation of up-link bandwidth may be prohibited when a request for a CBR connection is acknowledged in a state in which a CBR connection is already set up.

When only the communication service class of a constant bit rate is set up for a given connection, there is no need for dynamic bandwidth allocation to up-link signals. Therefore, steps ST13 and ST14 are skipped.

Time slots are not allocated for congestion reporting so that the up-link bandwidth is efficiently used.

Fourth Embodiment

In the first through third embodiments, it is assumed that an operator request concerns setting up of a new connection. Alternatively, an operator request may concern setting up a new subscriber interface.

Figure 3:
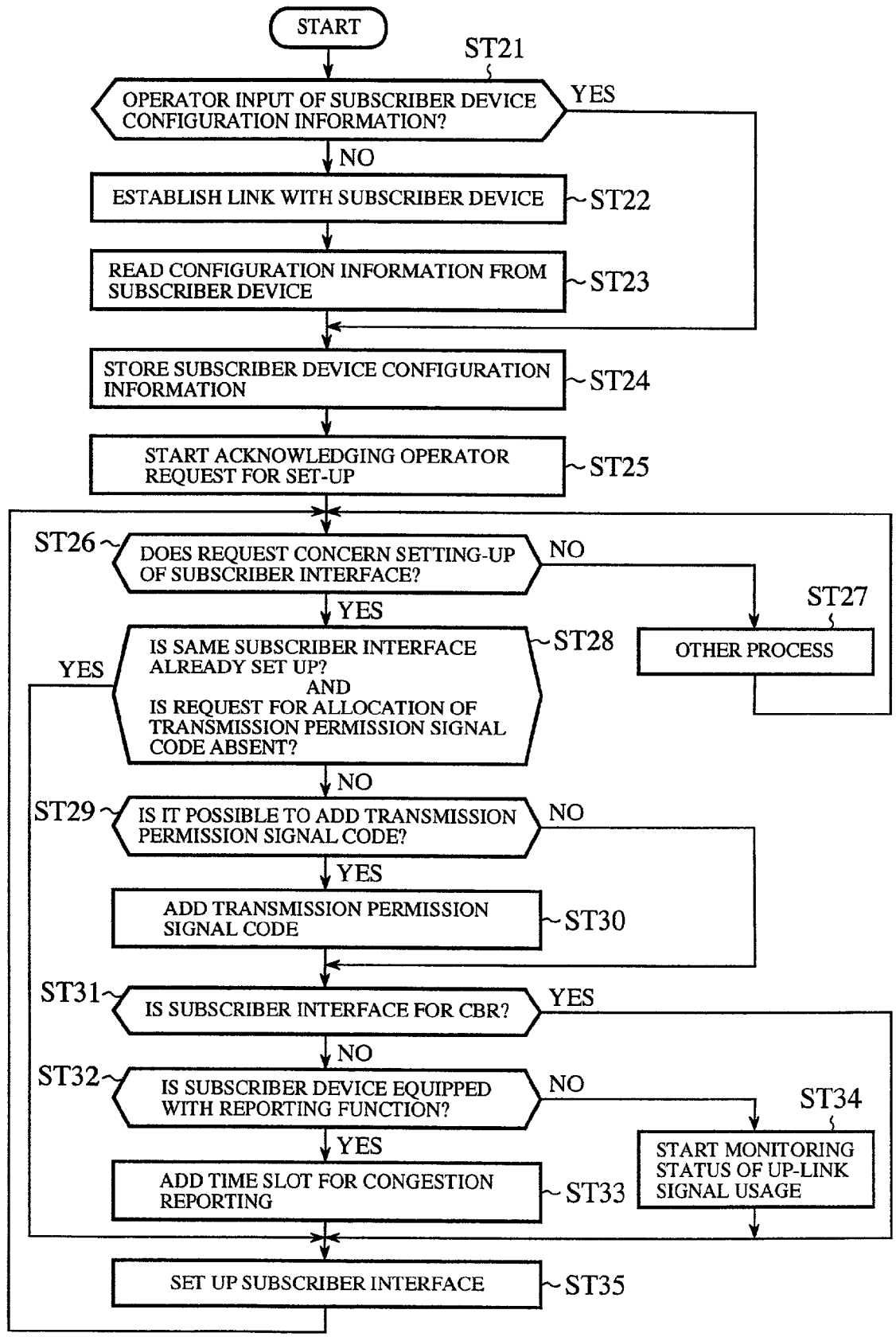
FIG. 3 is a flowchart showing another process performed by a bandwidth control unit.
Figure 4:
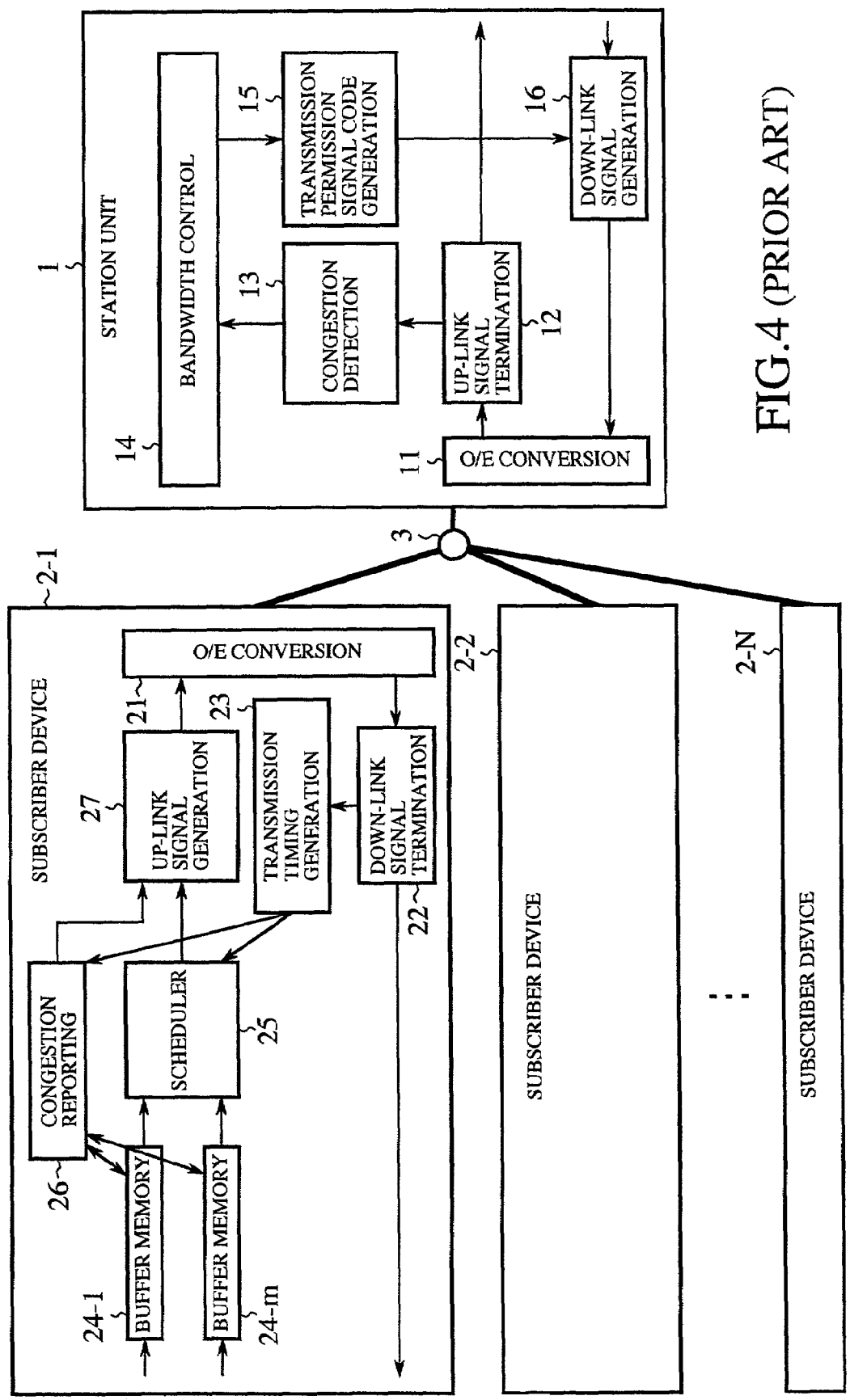
FIG. 4 shows a construction of an optical communication system according to the related art.
Figure 5:
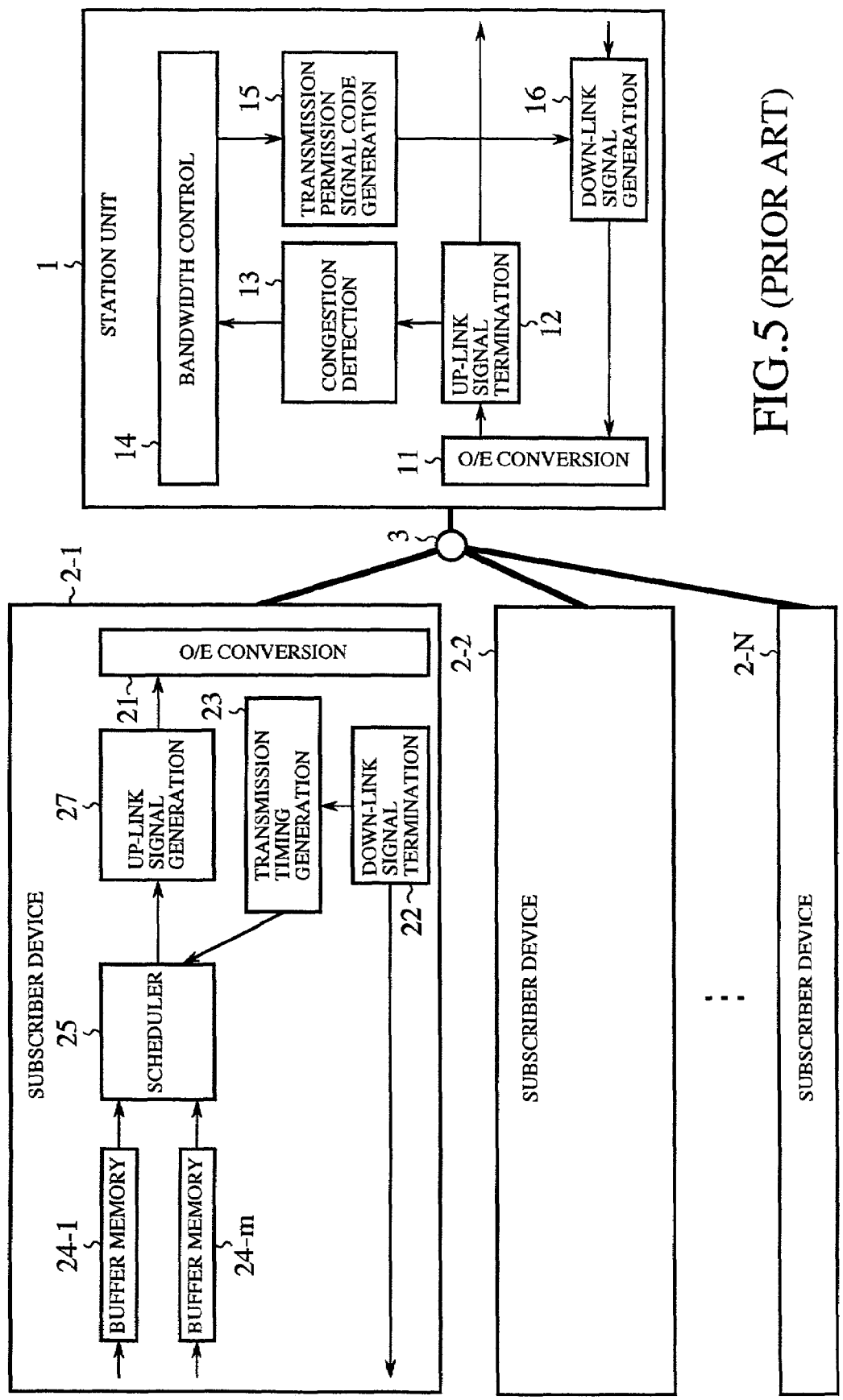
FIG. 5 shows a construction of another optical communication system according to the related art.
Figure 6:
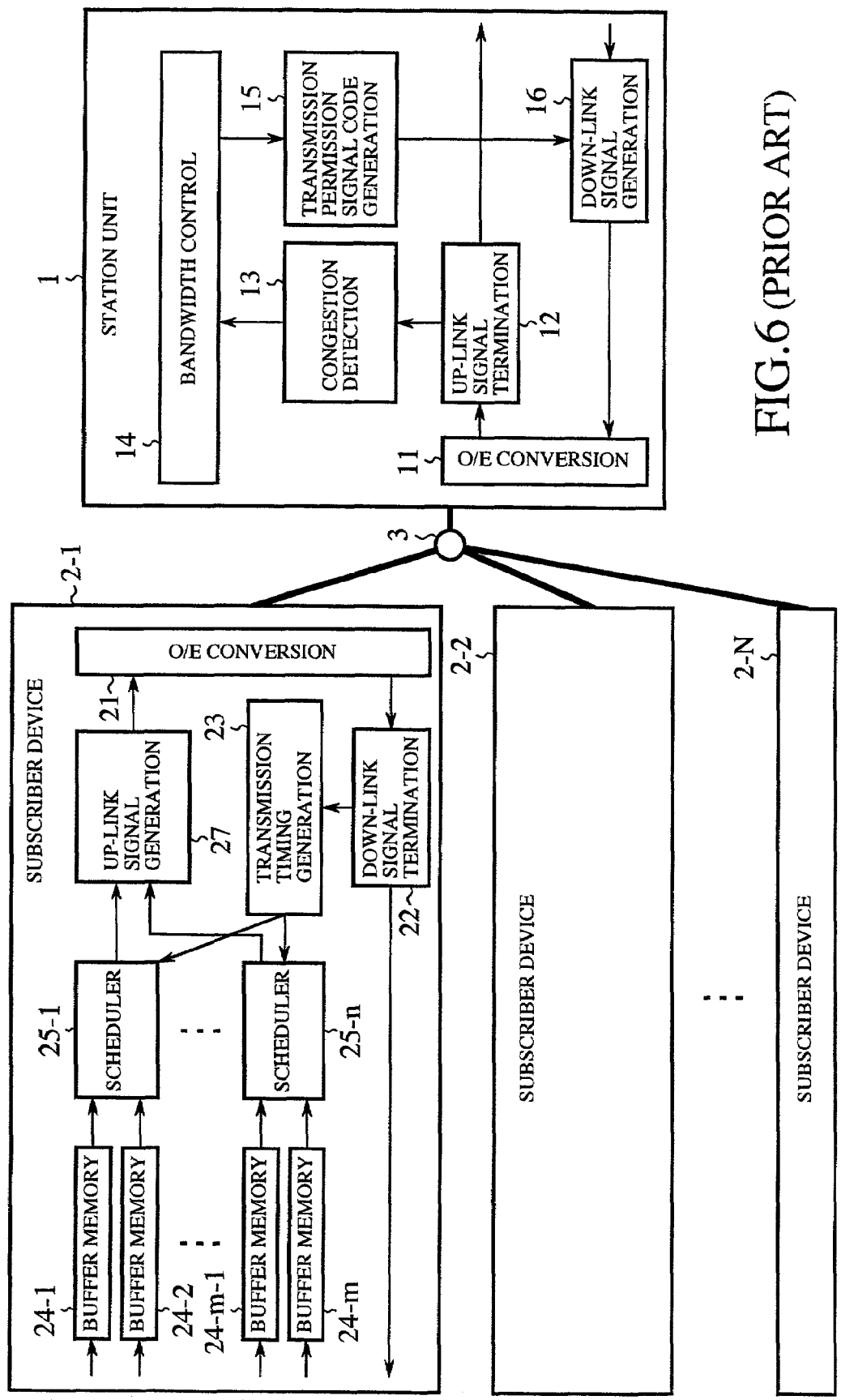
FIG. 6 shows a construction of still another optical communication system according to the related art.
Figure 7:
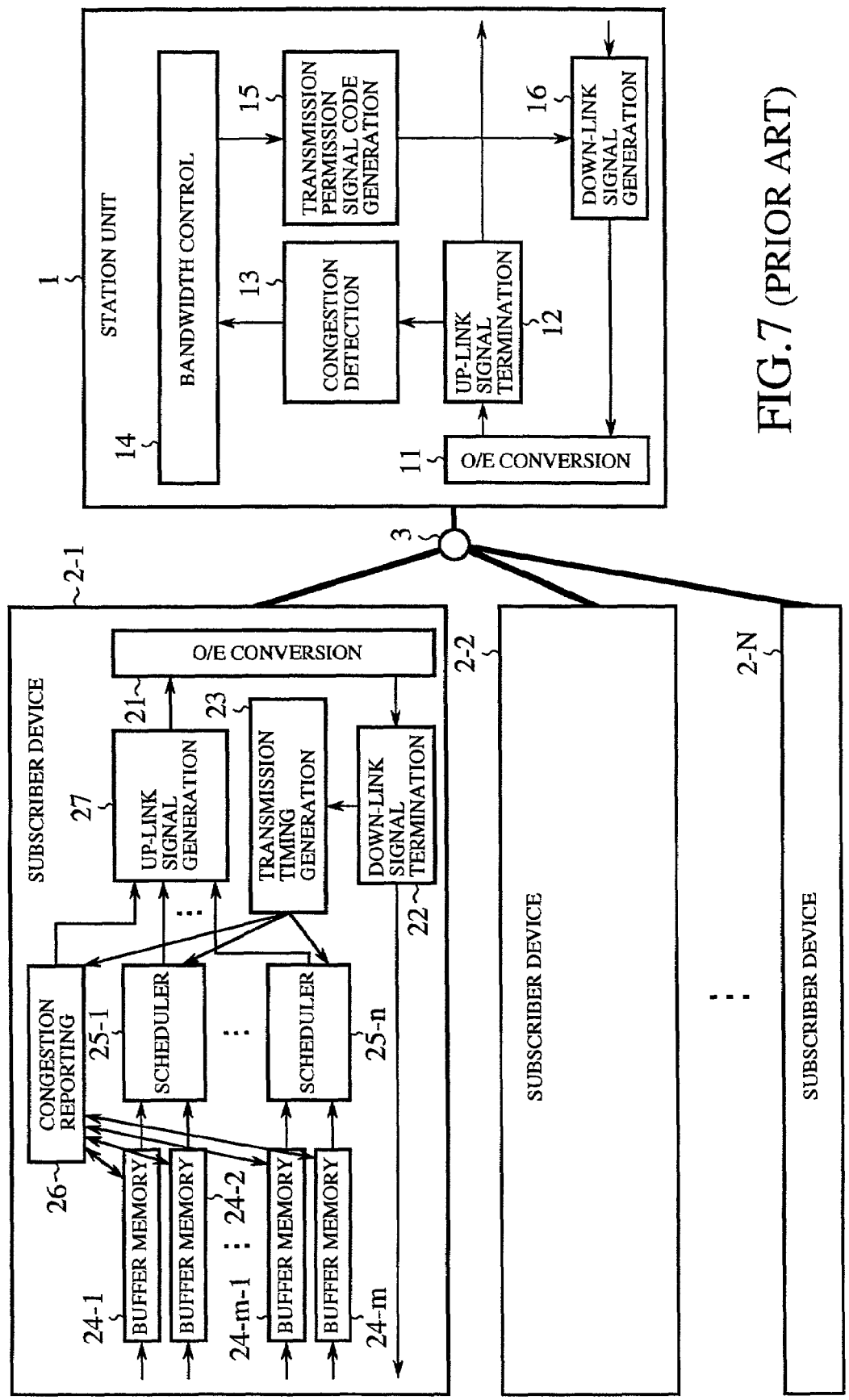
FIG. 7 shows a construction of yet another optical communication system according to the related art.

FIG. 3 is a flowchart showing an alternative process performed by the bandwidth control unit 46.

A description will now be given of the operation according to the fourth embodiment.

When the station unit 31 starts bidirectional communication with the subscriber devices 32-1-32-N, the bandwidth control unit 46 of the station unit 31 determines whether the input unit 45 receives an operator input of configuration information of an associated one of the subscriber devices 32-1-32-N (step ST21). For convenience of description, it is assumed here that there is no operator input provided. Upon determination that an operator input is not received via the input unit 45, the bandwidth control unit 46 establishes a link with the subscriber devices 32-1-32-N (step ST22) and allows the configuration information collection unit 44 to transmit a request for configuration information to the associated one of the subscriber devices 32-1-32-N.

The configuration information provision unit 58 of the associated one of the subscriber devices 32-1-32-N, receiving the request for configuration information from the station unit 31, transmit the configuration information of the associated subscriber device to the station unit 31.

When the configuration information collection unit 44 receives the configuration information, the bandwidth control unit 46 stores the configuration information related to the associated one of the subscriber devices 32-1-32-N (steps ST23, ST24). When an operator input of configuration information is provided, the configuration information collection unit 44 stores the provided information.

The bandwidth control unit 46 then acknowledges an operator request for setting up a new connection or for setting up a subscriber interface (step ST25). For convenience of description, it is assumed that the bandwidth control unit 46 acknowledges a request for setting up an unspecified bit rate (UBR) subscriber interface such as a LAN interface, in a state in which a CBR subscriber interface such as a voice interface is already set up.

The bandwidth control unit 46 determines whether the acknowledged request concerns setting up of a subscriber interface (step ST26), proceeding to step ST27 if the acknowledged request does not concern setting up of a subscriber interface, and proceeding to step ST28 if the acknowledged request concerns setting up of a subscriber interface. In the given example, the bandwidth control unit 46 acknowledges a request for setting up a UBR subscriber interface so that control is turned to step ST28.

In step ST28, the bandwidth control unit 46 refers to the configuration information related to the associated one of the subscriber devices 32-1-32-N so as to determine whether the subscriber interface with the same communication service class is already set up. More specifically, the bandwidth control unit 46 determines whether the UBR subscriber interface is already set up for the associated one of the subscriber devices 32-1-32-N. In the given example, only the CBR subscriber interface is set up so that a determination that the subscriber interface with the same communication service class is not yet set up.

The bandwidth control unit 46 also determines whether there is an operator request for allocation of a transmission permission signal code. For convenience of description, it is assumed that an operator request for allocation of a transmission permission signal code is acknowledged.

When the subscriber interface with the same communication service class is not set up or when a request for allocation of a transmission permission signal code is acknowledged, the bandwidth control unit 46 refers to the configuration information related to the associated one of the subscriber devices 32-1-32-N so as to determine whether it is possible to allocate a transmission permission signal code (step ST29). In the case of the subscriber device 32-2, a negative result of determination is yielded in step ST29 since there is only one scheduler. In the case of the subscriber device 32-1, a positive result of determination is yielded since there are a plurality of schedulers.

The bandwidth control unit 46 allocates an additional transmission permission signal code to the subscriber device 32-1 (step ST30) for which a positive result of determination is obtained in step ST29. No additional transmission permission signal code is allocated to the subscriber device 32-2.

The bandwidth control unit 46 then determines whether the new subscriber interface to be set up is a CBR interface (step ST31). If the subscriber interface to be established is a UBR interface, control is turned to step ST32 since the UBR connection is associated with variable traffic and the bandwidth is more efficiently used by dynamically controlling the frequency of generation of a transmission permission signal code additionally allocated.

In step ST32, a determination is made as to whether the associated one of the subscriber devices 32-1-32-N is equipped with the congestion reporting unit 56, by referring to the configuration information related to the associated one of the subscriber devices 32-1-32-N. A positive result of determination is yielded for the subscriber device 32-1 and a negative result of determination is yielded for the subscriber device 32-2.

The bandwidth control unit 46 then allocates a time slot for congestion reporting to the subscriber device 32-1 determined to be equipped with the congestion reporting unit 56 (step ST33). With this, it is ensured that the bandwidth is dynamically allocated to the up-link signal by referring to the status of congestion reported by the congestion reporting unit 56.

A time slot for congestion reporting is not allocated to the subscriber device 32-2 determined to be not equipped with the congestion reporting unit 56. Instead, the congestion detection unit 43 monitors the status of the use of the up-link signal by the subscriber devices 32-1-32-N (step ST34). Thus, dynamic bandwidth allocation to up-link signals is processed by considering the status of usage of up-link signals.

Finally, the requested UBR subscriber interface is established for the associated one of the subscriber devices 32-1-32-N before ending the entire process (step ST35).

As described, according to an up-link bandwidth allocation of the fourth embodiment, an additional transmission permission signal code is allocated to an associated one of the subscriber devices 32-1-32-N, when the communication service class provided by the subscriber interface already set up is different from the communication service class provided by the new subscriber interface to be set up, on the condition that it is determined from the configuration information that it is possible to allocate an additional transmission permission signal code. With this it is ensured that the up-link bandwidth is allocated to each communication service class. Thus, an up-link bandwidth is independently allocated to each communication service class.

In further accordance with the fourth embodiment, when the communication service class provided by the subscriber interface already set up differs from the communication service class provided by the new subscriber interface to be set up, and when the configuration information related to the associated one of the subscriber devices 32-1-32-N reveals that it is impossible to allocate an additional transmission permission signal code to the associated one of the subscriber devices 32-1-32-N, an up-link bandwidth is allocated without allocating a new transmission permission signal code. Therefore, bandwidth allocation adapted for the configuration of the subscriber device is thus available.

Fifth Embodiment

In the first embodiment, an example is given where an additional transmission permission signal code is allocated when the communication services class provided by the subscriber interface already set up is different from the communication service class provided by the new subscriber interface to be set up. Alternatively, an additional transmission permission signal code may be allocated, upon request for allocation thereof, to an associated one of the subscriber devices 32-1-32-N even when the communication service class provided by the subscriber interface already set up is the same as the communication service class provided by the new subscriber interface to be set up, on the condition that it is known from the configuration information related to the associated one of the subscriber devices 32-1-32-N that it is possible to allocate an additional transmission permission signal code. With this, it is ensured that the up-link bandwidth is allocated to each subscriber accommodated in the associated one of the subscriber devices 32-1-32-N.

For example, when a request for setting up a VBR subscriber interface is acknowledged in a state in which a VBR subscriber interface is already set up, control is turned from step ST28 to step ST35 absent any request for allocation of an additional transmission permission signal code. If there is a request for allocation of an additional transmission permission signal code, control is turned from step ST28 to step ST29. Subsequently, the same steps as executed in the fourth embodiment are executed.

Accordingly, an up-link bandwidth is independently allocated to each subscriber accommodated in a subscriber device upon an operator request for allocation of an additional transmission permission signal code.

Sixth Embodiment

In the first embodiment, a description is given of a case where a request for a VBR subscriber interface is acknowledged in a state in which a CBR subscriber interface is already established. Dynamic allocation of up-link bandwidth may be prohibited when a request for a CBR subscriber interface is acknowledged in a state in which a CBR subscriber interface is already set up.

When only the communication service class of a constant bit rate is provided by the subscriber interface set up for a given connection, there is no need for dynamic bandwidth allocation to up-link signals. Therefore, steps ST33 and ST34 are skipped.

Time slots are not allocated for congestion reporting so that the up-link bandwidth is efficiently used.

The present invention is not limited to the above-described embodiments, and variations and modifications may be made without departing from the scope of the present invention.

What is claimed is:

1. An optical communication system comprising:
    a station unit; and
    a plurality of subscriber devices connected to said station unit via an optical communication network, wherein
    said station unit allocates a bandwidth to up-link signals output from said plurality of subscriber devices in accordance with the traffic in said plurality of subscriber devices, and
    said station unit selects a method of up-link bandwidth allocation for a subscriber device in the plurality of subscriber devices based on a number of schedulers configured to schedule output of data stored in buffer memories in the subscriber device.

2. The optical communication system according to claim 1, wherein said station unit receives configuration information indicating a configuration of a corresponding one of said plurality of subscriber devices, from each of said subscriber devices.

3. The optical communication system according to claim 1, wherein said station unit receives an operator input of the configuration information.

4. The optical communication system according to claim 2, wherein each of the plurality of subscriber devices is connected to the station unit according to a communication service class, and said station unit allocates an up-link bandwidth to each communication service class by allocating an additional transmission permission signal code to a respective one of said plurality of subscriber devices, when a communication service class provided by a connection already set up is different from a communication service class provided by a new communication to be set up, on the condition that it is determined from the configuration information that it is possible to allocate an additional transmission permission signal code to the respective one of said plurality of subscriber devices.

5. The optical communication system according to claim 2, wherein said station unit allocates an up-link bandwidth to one of said plurality of subscriber devices without allocating an additional transmission permission signal code, when a communication service class provided by a connection already set up is different from a communication service class provided by a new communication to be set up, and when it is determined from the configuration information that it is impossible to allocate an additional transmission permission signal code to the one of said plurality of subscriber devices.

6. The optical communication system according to claim 2, wherein said station unit allocates an up-link bandwidth to each subscriber accommodated in one of said plurality of subscriber devices, by allocating an additional transmission permission signal code to the one of said plurality of subscriber devices, when a communication service class provided by a connection already set up is the same as a communication service class provided by a new communication to be set up, on the condition that there is a request for allocation of a new transmission permission signal code, and that it is determined from the configuration information that it is possible to allocate an additional transmission permission signal code to the one of said plurality of subscriber devices.

7. The optical communication system according to claim 2, wherein said station unit does not perform dynamic up-link bandwidth allocation when it is determined from the configuration information that only a communication service class of a constant bit rate is provided by a connection set up.

8. The optical communication system according to claim 2, wherein said station unit allocates an up-link bandwidth to each communication service class, by allocating an additional transmission permission signal code to one of said plurality of subscriber devices, when a communication service class provided by a subscriber interface already set up is different from a communication service class provided by a new subscriber interface to be set up, on the condition that it is determined from the configuration information that it is possible to allocate an additional transmission permission signal code to the one of said plurality of subscriber devices.

9. The optical communication system according to claim 2, wherein said station unit allocates an up-link bandwidth to one of said plurality of subscriber devices without allocating an additional transmission permission signal code, when a communication service class provided by a subscriber interface already set up is different from a communication service class provided by a new subscriber interface to be set up, and when it is determined from the configuration information that it is impossible to allocate an additional transmission permission signal code to the one of said plurality of subscriber devices.

10. The optical communication system according to claim 2, wherein said station unit allocates an up-link bandwidth to each subscriber accommodated in one of said plurality of subscriber devices, by allocating an additional transmission permission signal code to the one of said plurality of subscriber devices, when a communication service class provided by a subscriber interface already set up is the same as a communication service class provided by a new subscriber interface to be set up, on the condition that there is a request for allocation of a new transmission permission signal code, and that it is determined from the configuration information that it is possible to allocate an additional transmission permission signal code to the one of said plurality of subscriber devices.

11. The optical communication system according to claim 2, wherein said station unit does not perform dynamic up-link bandwidth allocation when it is determined from the configuration information that only a communication service class of a constant bit rate is provided by a subscriber interface set up.

12. The optical communication system according to claim 2, wherein said station unit allocates time slots for congestion reporting of one of said subscriber devices when it is determined that the one of said subscriber devices is equipped with a congestion reporting function, so as to perform up-link bandwidth allocation by referring to a congestion report transmitted from the one of said plurality of subscriber devices.

13. The optical communication system according to claim 2, wherein said station unit monitors a status of up-link signals from said plurality of subscriber devices, when it is determined from the configuration information that one of said plurality of subscriber devices is not equipped with a congestion reporting function.

14. An optical communication system comprising:
a station unit; and
a plurality of subscriber devices connected to said station unit via an optical communication network, wherein
said station unit allocates a bandwidth to up-link signals output from said plurality of subscriber devices in accordance with the traffic in said plurality of subscriber devices,
said station unit receives configuration information indicating a configuration of a respective one of said plurality of subscriber devices from each of said subscriber devices, and said station unit selects a method of up-link bandwidth allocation by considering the configuration information, and
said station unit allocates an up-link bandwidth to each subscriber accommodated in the respective one of said plurality of subscriber devices by allocating an additional transmission permission signal code to the respective one of said plurality of subscriber devices, when a communication service class provided by a connection already set up is the same as a communication service class provided by a new communication to be set up, on the condition that there is a request for allocation of a new transmission permission signal code, and that it is determined from the configuration information that it is possible to allocate an additional transmission permission signal code to the respective one of said plurality of subscriber devices.

15. An optical communication system comprising:
a station unit;
a first subscriber device including a congestion reporting unit and connected to the station unit via an optical communication network;
a second subscriber device not including a congestion reporting unit and connected to the station unit via the optical communication network, wherein
the station unit allocates a bandwidth to up-link signals output from the first and second subscriber devices in accordance with the traffic in the first and second subscriber devices, and
the station unit selects different methods of up-link bandwidth allocation for the first and second subscriber devices based on first device configuration information indicating that the first subscriber device includes the congestion reporting unit and second device configuration information indicating that the second subscriber device does not include the congestion reporting unit.

* * * * *